(12) United States Patent
Owens (10) Patent No.: US 6,368,544 B1
(45) Date of Patent: Apr. 9, 2002

(54) METHOD AND APPARATUS FOR ACCELERATING THE MANUFACTURE OF MOLDED PARTICLEBOARD PARTS

(76) Inventor: Thomas L. Owens, 631 Sylvan Ct., Batavia, IL (US) 60510

(*) Notice: Subject to any disclaimer, the term of this patent is extended or adjusted under 35 U.S.C. 154(b) by 0 days.

(21) Appl. No.: 09/434,237

(22) Filed: Nov. 5, 1999

(51) Int. Cl.⁷ .......................... B29B 13/08; B29C 67/02
(52) U.S. Cl. ...................... 264/463; 219/679; 219/756; 264/489; 264/490; 264/122; 425/174.4
(58) Field of Search .................. 264/463, 489, 264/490, 491, 109, 122; 425/174.4; 219/679, 692, 756, 678

(56) References Cited

U.S. PATENT DOCUMENTS

| | | | |
|---|---|---|---|
| 4,018,642 A | 4/1977 | Pike et al. | 156/272 |
| 4,269,581 A | 5/1981 | Ury et al. | 425/174.4 |
| 4,456,498 A | 6/1984 | Churchland | 156/275.5 |
| 5,228,947 A | 7/1993 | Churchland | 156/580.1 |
| 5,756,975 A | 5/1998 | Harris et al. | 219/696 |

OTHER PUBLICATIONS

T.M. Maloney, *Modern Particle Board & Dry–Process Fiberboard Manufacturing*, Miller Freeman, Inc., San Francisco, 1993, pp. 557–559 & pp. 530–537.

Primary Examiner—Mathieu D. Vargot (57) ABSTRACT

All of the current processes for making molded particleboard products require very long furnish dwell times within a heated press, due to the low heat transfer rates from the heated molds to the furnish being compressed. Furnish dwell times vary between approximately one minute to more than 10 minutes, depending upon the part thickness. Since profitability of a particleboard molding operation is closely related to product throughput, these long furnish dwell times within the heated press limit production rates and continue to be a major economic concern to the industry. The essence of the invention is a heretofore unsuggested use of radiowave energy to speed production of molded particleboard parts by preheating the furnish prior to the application of heat and pressure within the forming mold. Because radiowaves propagate readily throughout the volume of the furnish, rapid heating is obtainable even for a loose, uncompacted particulate furnish that has very poor thermal conductivity. By utilizing a radiowave preheating scheme, rather than applying radiowaves simultaneously with hot pressing, relatively simple yet highly effective radiowave applicators may be devised.

16 Claims, 4 Drawing Sheets

METHOD AND APPARATUS FOR ACCELERATING THE MANUFACTURE OF MOLDED PARTICLEBOARD PARTS

FIELD OF THE INVENTION

This invention relates to the manufacture of three-dimensionally molded particleboard parts.

BACKGROUND OF THE INVENTION

The raw materials used in the manufacture of molded particleboard parts consist of mixtures of lignocellulosic materials combined with heat-curable binders whose rate of cure is accelerated by the application of heat. The mixtures may take the form of loose collections of particles, fiber bundles, flakes, slivers, or shavings. The mixtures may also be compacted to some extent to create molded preforms. The various forms of the raw material for molded particleboard parts will be collectively referred to as the "furnish" throughout this disclosure.

Many different lignocellulosic materials, particle types, and particle sizes are used in the furnish. For example, wood-based furnish can take the form of wood chips, wood-fiber bundles, wood flakes, wood shavings, wood slivers, wood flour, or a variety of wood residues. The most common binders used in the furnish are urea-formaldehyde and phenol-formaldehyde, while isocyanate resins are used only occasionally. These binders are all synthetic heat-curable binders in which curing is accelerated by the application of heat. In most common furnishes, the binder constitutes approximately 2–10% of the furnish, although higher binder percentages are occasionally used.

The furnish is compressed into final shape between matched male and female metal dies that are pressed together and simultaneously heated in a conventional heated press. The female die is known as the cavity and the matched male die is known as the punch. In operation, the shape of the facing surfaces of the punch and the cavity impart three-dimensional features to the finished particleboard parts. Molded particleboard parts are to be distinguished from standard flat-panel composition boards that could be characterized as being only two-dimensional. The present invention does not pertain to two-dimensional flat-panel composition boards, such as these, since these products are not normally molded using cooperating metal dies.

A simple particleboard molding process is used to produce shallow draws on embossed products, such as door skins, cabinet fronts, and embossed wall panels. More sophisticated methods have been developed to mold parts having deep draws, such as cores for upholstered furniture, tabletops with profiled edges, irregular boxes, curved drawer fronts, beverage cases, and toilet seats. Many of the initial steps in producing molded particleboard parts are similar to the initial steps for producing standard flat composition boards. For example, furnishes are prepared in very similar ways. Important differences occur primarily at the forming station, where the furnish is consolidated into its finished form.

All of the current processes for making molded particleboard products require very long furnish dwell times within the heated press, due to the low heat transfer rates from the heated molds to the furnish being compressed. Furnish dwell times vary between approximately one minute to more than 10 minutes, depending upon the part thickness. Since profitability of a particleboard molding operation is closely related to product throughput, these long furnish dwell times within the heated press limit production rates and continue to be a major economic concern to the industry.

At first glance, it may seem possible to remedy this situation and decrease furnish dwell times within the heated press by further heating the fanish with radiowave energy as the furnish is being consolidated in the press. This process is known as in-press radiowave heating. The term, radiowave, by standard definition, is an electromagnetic wave having a frequency between 10 kilohertz up to about 30 gigahertz. Using supplementary radiowave heating, decreased furnish dwell times within the heated press would be expected because radiowaves are known to propagate throughout the volume of dielectric materials, thereby producing rapid volumetric heating in radiowave-absorptive dielectrics, such as wood/binder compositions.

In practice, for most molded particleboard sizes and shapes, radiowaves applied within the forming mold during the hot-pressing operation do not establish uniform electric field distributions throughout the volume of the furnish contained within the mold. This is because only a relatively small number of microwave modes can be established within the restrictive confines of the mold interior. In addition, because the thickness of the molding space between the punch and the cavity bottom is usually much less than a wavelength at commonly used microwave frequencies, the microwave electric fields are polarized primarily in only a single direction roughly normal to the base of the part.

With few microwave modes and only a single field polarization, strong electric field concentrations form at various standing-wave maxima, and microwave fields are attenuated within intricate mold features. High microwave field levels will also be produced near the point where microwaves are fed into the mold interior. Since the parts are held in a stationary position within the mold cavity, these field variations lead to strong non-uniform heating of the compacted furnish and non-uniform curing. In addition to producing non-uniform heating and curing of the furnish, application of microwaves to the mold interior during hot-pressing would require complex new mold designs and replacement of existing molds, making retrofitting of microwave-heated mold cavities to existing molding equipment impractical and uneconomical.

Radiowave frequencies below the microwave range have also been considered for in-press radiowave heating. For the most common industrial frequency bands in this range, wavelengths are much greater than mold dimensions. Radiowave system construction in this frequency range differs considerably from construction in the microwave range. Compared to microwave heating, these relatively low frequencies produce much less heating power within the furnish for a given electric field level, since the power density scales primarily with frequency. To match microwave power densities, much higher electric fields are required at lower frequencies, which can lead to more frequent arcing.

Non-uniform in-press radiowave heating can also occur in this low frequency range just as it does for in-press radiowave heating in the microwave range. For low frequency radiowave in-press heating, non-uniform heating can occur because of fringing fields, field concentrations at sharp mold features, and variations in field levels due to variations in the thickness of the parts. Because the use of low frequency radiowaves for in-press heating also requires replacement of existing molds, the same problems with retrofitting existing particleboard molding operations exist, as were described for in-press microwave heating schemes.

As a consequence of the problems that occur when radiowaves are applied within the mold cavity as the mold is hot-pressed, another solution to the problem of long hot-press dwell times and long production cycles for molded particleboard parts is needed.

SUMMARY OF THE INVENTION

The essence of the invention is a heretofore unsuggested use of radiowave energy to speed production of molded particleboard parts by preheating the furnish prior to the application of heat and pressure within the forming mold during the hot-pressing operation. Because radiowaves propagate readily throughout the volume of the furnish, rapid heating is obtainable even for a loose, uncompacted particulate furnish that has very poor thermal conductivity. By utilizing a radiowave preheating scheme, rather than applying radiowaves simultaneously with hot pressing, relatively simple yet highly effective radiowave applicators may be devised. In many cases, standard applicators disclosed in the prior art may be used.

An important precept of the invention is that the temperature of the preheated furnish is kept low enough that the dry-out point of the binder is not reached, and it is still possible to obtain a good bond between fibers in the subsequent hot-pressing operation. The energy applied to the preheated furnish reduces the energy required from the heated press in completing the cure of the molded particleboard part, resulting in reduced furnish dwell times within the heated press.

There are at least two general radiowave preheating scenarios. The first scenario will be referred to as "external preheating" and the second scenario will be referred to as "insitu preheating." In the external preheating scenario, radiowave preheating is performed as a completely independent operation, before the furnish is added to the forming mold and before the furnish is consolidated and cured within the heated press. The furnish is unconstrained in this case, which allows the furnish to be easily translated over distances greater than a wavelength, while radiowaves are applied, assuring uniform exposure of the furnish to radiowave fields and uniform radiowave heating of the furnish. After preheating the furnish with radiowave energy, the furnish is quickly transferred to the cavity of the forming mold. The punch for the forming mold is then inserted into the cavity and the preheated furnish is pressed between the mold dies. The whole operation is carried out as quickly as possible, to avoid precure of the furnish and to assure a good bond between fibers during hot-pressing. In the heated press, additional heat energy is applied to the furnish to complete the cure and solidify the part in its final form.

Since radiowaves are applied before the furnish is added to the hot-press forming mold, the forming mold does not need to include provisions for coupling microwaves into the furnish. In fact, no modification of existing all-steel molds is required. Molded particleboard parts of any size or complexity may be formed, limited only by the size and forming properties of well known conventional steel molds. Radiowave preheating may be readily added as a separate and independent operation, making it easily retrofitted to existing molded particleboard production plants. In addition, because radiowave preheating by the external preheating scenario is a separate operation from the final hot pressing step, various molds may be interchanged in a given press without changing the radiowave preheating equipment.

The second radiowave preheating scenario, insitu radiowave preheating, is similar to the external radiowave preheating scenario, except that the furnish is preheated directly in the cavity of the forming mold prior to compressing the forming mold in the hot press. There are several specific procedures that may be used for insitu radiowave preheating.

For example, one procedure specifies that the punch is partially inserted into the cavity in a standby or ready position while radiowave preheating is applied to the cavity within the heated press. This procedure minimizes the time between preheating and hot-pressing. In this case, some alteration of the forming mold is required. Provisions for feeding radiowave power into the cavity and suppressing radiowave emissions must be added to the to of the cavity portion of the forming mold. To accommodate the extra length added to the cavity by the microwave feed and the radiowave suppression structure, the punch length must be increased. While modifications to the mold cavity and punch are required, these modifications are considerably simpler than the modifications that would be required for in-press radiowave heating schemes.

To avoid the need for modifications of the hot-press forming mold for insitu preheating, an alternative procedure may be used. In this alternative insitu procedure, unheated furnish is first added to the forming mold cavity. Radiowaves are then applied to the unheated furnish within the mold cavity prior to insertion of the punch, while the opening into the mold cavity is unobstructed. Radiowave preheating can then be performed outside of the heated press since the cavity can be separated from the punch. For example, the cavity can be mounted on a sliding platen, moved out of the press for radiowave preheating, and back into the press for hot-pressing and final cure. Utilizing the sliding platen, the entire cavity may be inserted into a multimode radiowave cavity or other radiowave applicator positioned beside the hot press.

Within the multimode radiowave cavity, radiowaves propagate readily to the furnish through the opening in the mold cavity, as long as the dimensions of the opening are on the order of a wavelength or more. No modifications of existing all-steel molds are required for this insitu preheating procedure so that it can be readily adapted to existing particleboard molding operations, as was the case for external preheating scenarios.

In addition, by using a sufficiently large microwave cavity, the furnish contained in several forming cavities may be preheated simultaneously, which would be useful in some operations that press several parts at the same time in the heated press. Time between preheating and hot pressing is minimized in both of the above insitu procedures through the elimination of the furnish transfer step which moves the preheated furnish from the preheater to the cavity of the forming mold.

In both the external preheating scenario and the insitu preheating scenario, as much as $2/3$ of the total energy required for curing can be applied during the preheating stage of the invention, as will be described in more detail later in this disclosure. A much lower energy requirement is then placed upon the heated press, resulting in substantially reduced furnish dwell times within the heated press. By performing the radiowave preheating operation in parallel with the hot-pressing operation, with its reduced furnish dwell time, production rates are greatly increased using the preheating concept disclosed herein.

Because of the advantages disclosed in the above discourse, it is apparent that the invention provides a practical and economical approach to reducing furnish dwell times within the heated press and increasing production rates in new and existing molded particleboard plants. Implementation of the teachings of this disclosure will result in a practical and economical means of increasing molded particleboard production rates, reducing manufacturing costs, and improving profitability.

These economic benefits will encourage the manufacture of new molded particleboard parts and improve production efficiencies of existing parts. In addition, the invention will make it economically feasible in many cases to replace plastic parts with parts manufactured from wood particles. Since wood is a renewable resource, unlike the petroleum from which plastics are manufactured, molded particleboard materials should be derivable from more stable raw material sources, and should provide an environmentally attractive alternative to plastic parts.

While radiowave preheating of furnish to speed production of molded particleboard parts has not been previously suggested, radiowave preheating of standard flat-panel composition boards has been suggested and, in fact, implemented in various ways in the particleboard and fiberboard industries. One of the earliest suggestions to use microwaves to accelerate the curing of resinous binders in flat composition boards was disclosed by Pike and Barnes in U.S. Pat. No. 4,018,642.

In this patent, Pike and Barnes mention the use of microwaves to ". . . heat the resin and accelerate its curing, pressure being applied during the application of microwave energy or shortly thereafter," While this statement alludes to the use of a microwave preheating process to accelerate resin curing, the disclosure describes in a definitive way only preheating of flat panel boards having two dimensional characterization. There is no suggestion to use microwave preheating to accelerate the curing of three-dimensionally molded particleboard parts.

Because of their more complex structure, these three-dimensional parts have unique problems associated with radiowave heating that are not encountered in radiowave heating of boards having a two-dimensional characterization. These unique problems were never recognized nor pointed out in the prior art of Pike and Barnes, nor in any other prior art reference. For example, none of the prior art recognizes the problem of inaccessibility of microwaves in the intricate recesses of many three-dimensional molds, which contributes to non-uniform microwave heating of the furnish. Neither does the prior art recognize the problem of large standing waves for in-press microwave heating schemes, also contributing to non-uniform heating and curing of to the furnish. These unique problems discourage the use of in-press radiowave heating, but encourage the use of radiowave preheating outside of the hot press where greater control of heating uniformity can be obtained. Yet none of the prior art references recognize or suggest the advantages of radiowave preheating over in-press radiowave heating in the manufacture of molded particleboard parts.

In fact, Pike and Barnes, teach away from the use of microwave preheating in general as a "less preferred embodiment" compared to in-press microwave heating in the formation of flat board products. Yet it has been made clear in this section and in the previous section of the present disclosure that microwave preheating is actually a preferred method for accelerating the manufacture of molded particleboard parts because of the unique features of molded particleboard manufacture.

In-press microwave heating, the preferred embodiment of the invention of Pike and Barnes, is impractical in most situations in the manufacture of molded particleboard parts because of the complexity of the molds, and because retrofitting to existing molding operations requires major equipment modifications. In addition, if the present invention were obvious, those skilled in the art of molded particleboard manufacture surely would have implemented the invention by now. Yet there is no description of implementation of radiowave preheating of molded particleboard parts in any prior art reference, including the very comprehensive survey of the particleboard industry given by Maloney (1993). The fact that the invention has not been implemented in the manufacture of molded particleboard parts, despite the great advantages disclosed in this section, indicates that the present invention is not obvious.

BRIEF DESCRIPTION OF THE DRAWINGS

The invention will be better understood with reference to the accompanying drawings, also forming part of this disclosure, wherein.

DETAILED DESCRIPTION OF THE INVENTION

In practice of the disclosed preheating method to accelerate the production of molded particleboard parts, a radiowave applicator is required to preheat the furnish prior to consolidating and curing the furnish in a heated mold. The applicator must provide sufficiently uniform radiowave heating of the furnish to assure uniform curing of the binder during the hot pressing operation. In parallel processing methods, the applicator must also preheat the furnish over a time period less than or on the order of the furnish dwell time within the heated press in order to preheat the furnish prior to completion of the hot pressing step of a second furnish which is ahead of the preheated furnish in the production cycle.

Figure 1:
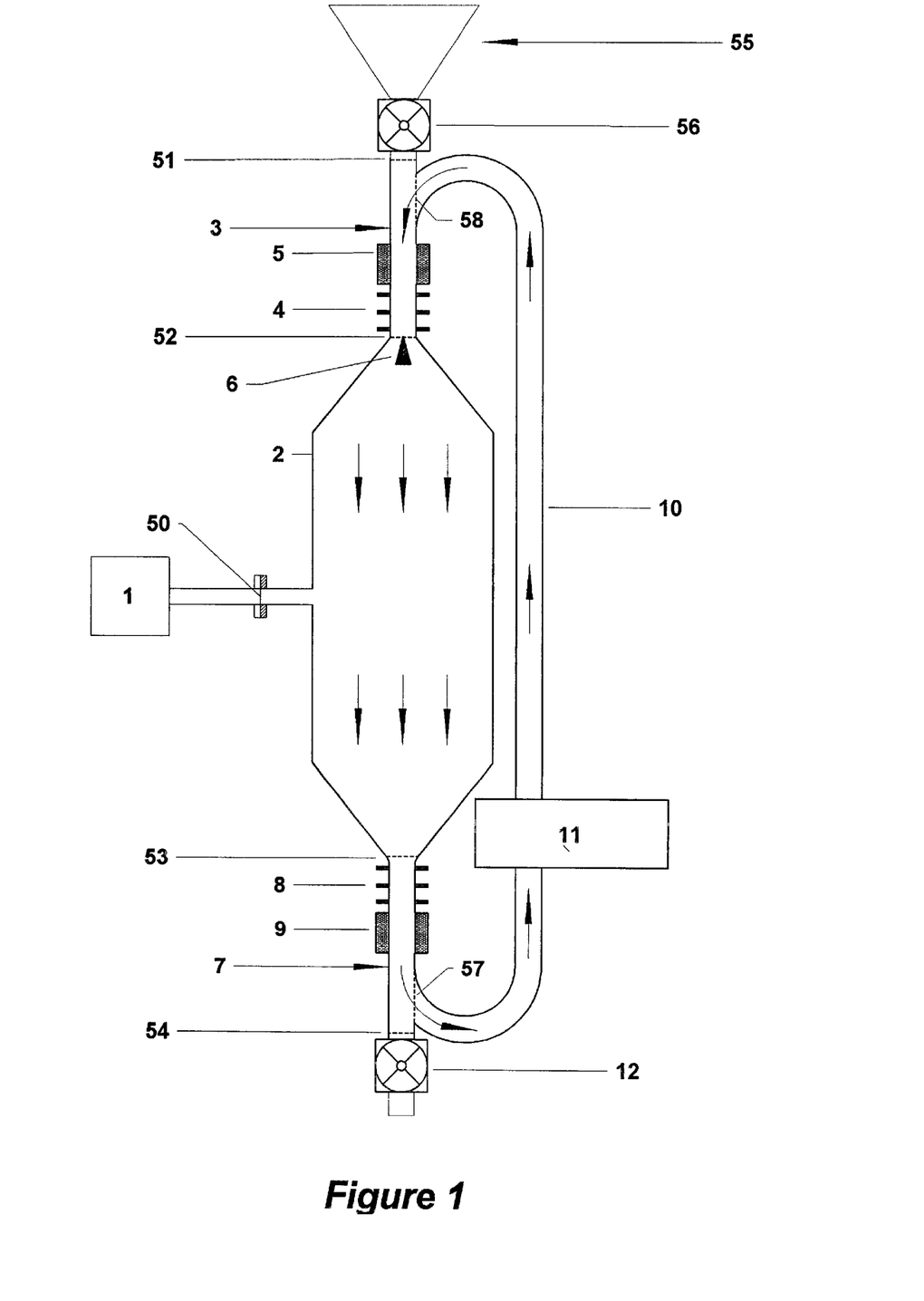
FIG. 1 is an interior view of one embodiment of a radiowave preheater to preheat a furnish prior to adding the preheated furnish to a heated mold, in accordance with the external preheating scenario described above.

These requirements are readily accomplished for a free-flowing particulate furnish using the radiowave preheater depicted in cross-section in FIG. 1. Referring to FIG. 1, there is shown a radiowave power source 1 which provides the heating power for preheating the furnish. Preferred choices for the radiowave frequency are approximately 915 MHz or 2,450 MHz, since these are within the Industrial, Scientific, and Medical (ISM) frequency bands set aside by F.C.C. regulations. Radiowave power sources in these bands are readily available. Power outputs from individual sources in the ISM bands are as high as 75 kilowatts. Other frequencies could also be used to power the preheater depicted in FIG. 1 as long as radiowave emissions are below levels required by government regulations, and wavelengths are on the order of or less than device dimensions.

Power from the radiowave source 1 is applied to a multimode radiowave cavity 2 via a radiowave interface that contains the components and structure for obtaining impedance transformations required for efficiently transmitting radiowaves from the radiowave source 1 into the multimode radiowave cavity 2. For example, the radiowave interface may consist of a radiowave input port 50 terminating at the multimode radiowave cavity 2 in a single coupling aperture or a series of apertures cut into the outer wall of the multimode radiowave cavity 2. The aperture sizes are adjusted to minimize radiowave reflections at the input of the radiowave interface. Other radiowave interfaces will present themselves to those skilled in the art.

The multimode radiowave cavity 2 is a metal enclosure in which all three dimensions are on the order of or greater than the wavelength of the radiowave source 1. In a radiowave cavity of this size, a large number of radiowave resonances, or modes, are established within the multimode radiowave cavity 2 and a large number of radiowave field polarizations. Within a well designed radiowave multimode cavity 2, enough radiowave modes and polarizations combine to form a substantially uniform electric field distribution over most of the volume of the multimode radiowave cavity 2. The multimode radiowave cavity 2 can have almost any boundary shape from a simple cylindrical shape to very complex three-dimensional shapes, depending upon various design considerations and the level of field uniformity desired within the multimode radiowave cavity 2. Various moving reflective devices, known as mode stirrers, may also be placed within a multimode radiowave cavity to produce additional randomization of modes and promote further heating uniformity. In FIG, 1, an opening in the top of the multimode radiowave cavity 2 forms a cavity inlet for receiving furnish in particulate form. The particulate furnish exits the multimode radiowave cavity 2 through an opening at the bottom of the radiowave multimode cavity which forms a cavity outlet 2.

Furnish is added to the multimode radiowave cavity 2 via a hollow feed duct 3. The feed duct 3 has a first opening, the feed inlet 51, for receiving particulate furnish, and a second opening, the feed outlet 52, through which furnish passes into the multimode radiowave cavity 2 via the cavity inlet. In a preferred embodiment, the feed duct 3 has cross-sectional dimensions less than approximately one-half wavelength of the microwave source 1 so that the feed duct 3 acts as a waveguide below radiowave cutoff. If the feed duct 3 is sufficiently below radiowave cutoff and is sufficiently long, nearly all of the radiowave energy from the multimode radiowave cavity 2 will be reflected back into the multimode radiowave cavity 2 at the feed outlet 52, thereby containing radiowave energy within the multimode radiowave cavity 2 and eliminating harmful emissions outside the device.

To achieve additional containment of radiowave energy, a radiowave choke 4 may be built in the periphery of the feed duct 3 near the feed outlet 52. Standard microwave design practices may be used to design the choke 4. To further attenuate any residual radiowaves that may pass through the radiowave choke 4, a radiowave absorber 5 may be built into the walls of the feed duct 3 near the feed inlet 51. Radiowave absorbers may also be placed in the elements of the choke 4.

Near the junction between the feed duct 3 and the multimode radiowave cavity 2 is a spreader nozzle 6. The spreader nozzle 6 disperses the furnish as it enters the multimode radiowave cavity 2. By dispersing the furnish, more uniform microwave exposure of the furnish will be assured. The spreader nozzle 2 is an optional component whose use will depend upon the level of heating uniformity desired.

As the furnish passes through the multimode radiowave cavity 2, it is heated by the microwave fields within the multimode radiowave cavity 2. Furnish is collected and withdrawn at the bottom of the multimode radiowave cavity 2 through an extraction duct 7 that includes a radiowave choke 8 and a radiowave absorber 9 similar to the corresponding components 4, 5 of the feed duct 3. Furnish is received from the cavity outlet of the multimode radiowave cavity through an opening in the extraction duct 7. The opening will be referred to as the extraction inlet 53. Furnish exits the extraction duct through and outlet opening referred to as the extraction outlet 54.

A return duct 10 is connected between the extraction outlet 54 and the feed inlet 51. The return duct has an opening, the return inlet 57, for receiving particulate furnish from a branch line out of the extraction duct 7. The return duct also has an outlet opening, the return outlet 58, for passing particulate furnish to the feed duct 3 through a branch line into the feed duct 3. With the connection of the return duct 10 between the feed inlet 51 and extraction outlet 54, a closed path is formed through the multimode radiowave cavity 2, the extraction duct 7, the return duct 10, and the feed duct 3.

Particulate furnish is circulated continuously or intermittently along this closed path while radiowaves are applied. The path of the recirculated furnish for the embodiment shown in FIG. 1 is indicated by the arrows in the figure. On each pass through the multimode radiowave cavity 2, the furnish picks up an increment of heat from the microwave fields. Furnish is translated around this closed path using a high-velocity air stream created with a material transfer blower 11 placed in the return duct 10 of the device. As mentioned earlier, furnish movement through the radiowave fields assures uniform exposure of the furnish to radiowave fields and provides highly uniform radiowave preheating of the furnish.

In place of the material transfer blower 11, it is possible to circulate the furnish using various other material transfer means, such as a screw conveyor. In one embodiment using a screw conveyor, the screw conveyor would be placed along the entire length of return duct 10 to lift the furnish and transfer it to the feed duct 3. From the feed duct 3 particulate furnish would fall through the multimode radiowave cavity 2 under gravitational forces, returning to the feed point of the screw conveyor near the return inlet 57.

Furnish supplied to the radiowave preheater shown in FIG. 1 may be added at a variety of points along the recirculating path of the furnish. In the embodiment illustrated in FIG. 1, the furnish is add to the preheater through a fill line 55 shown at the top of the preheater. The fill line 55 connects to the feed duct 3 at the feed inlet 51. An air gate 56 may be used in the fill line 55 to control the rate of delivery of particulate furnish to the preheater.

After being recirculated numerous times through the device, the furnish will reach a predetermined target temperature. After reaching the target temperature, the furnish is removed as quickly as possible from the preheater and transferred to a mold cavity prior to hot pressing of the finish. The furnish may be removed through an airgate or an open duct which connects to the extraction outlet 54. By closing off the feed inlet 51 and the return inlet 57, and drawing in outside air at the blower inlet, the preheated furnish can be blown to the airgate 12 to empty the preheated furnish rapidly and completely.

The target temperature for the preheated furnish will preferably approach the maximum temperature that will still yield a good cure of the binder and a good bond of the lignocellulosic material in the final hot-pressing operation. For a urea-formaldehyde resin binder, for example, a maximum preheat temperature would be approximately 160 degrees. F. Since the common temperature at which urea-formaldehyde is cured is approximately 212 degrees F., radiowave energy to preheat the furnish represents nearly $2/3$ of the energy required for curing the resin and finishing the part. Radiowave preheating thereby reduces the heat energy required in the heated press by nearly $2/3$. A substantial reduction in hot press dwell times will be obtained in this situation. By preheating a particular load of furnish, while the cure of a second furnish is completed simultaneously within the heated press, a substantial gain in overall production speeds will occur.

A modified embodiment of the preheating apparatus shown in FIG. 1 may also be used to mix the binder and lignocellulosic material. The preheater then performs an important part of the furnish preparation step. Mixing may be accomplished by injecting fluid binder into the moving stream of particulates. An atomizer is used to form a fine spray of binder fluid to facilitate uniform coating of the particulates. By locating the atomizer along the return duct, the atomizer could be shielded from microwave fields. Radiowave preheating may be performed, in the normal fashion, after mixing the furnish within the preheater. Preheating may also be performed while the binder is being added to the system or slightly before the binder is added. These last two possibilities will minimize the time that the binder is subjected to heat, minimizing the potential for precure within the preheater.

The preheater illustrated in FIG. 1 may also be used to heat particulate materials other than lignocellulosic materials or it may be used to dry particulate matter in general. For example, in the context of the present invention, the preheater may be used to dry the lignocellulosic portion of the furnish to the optimum level prior to the addition of the binder. Thereby, an additional furnish preparation step is performed within the preheater, saving additional furnish preparation equipment.

In a broader sense, the preheater concept illustrated in FIG. 1 may be utilized prior to the addition of binders to dry the raw furnish used in flat composition board manufacture. A number of drying technologies currently exist for drying furnish used in flat composition board manufacture, but each of the technologies exposes the furnish to extremely high temperatures. In some dryers, inlet air temperatures up to 1600 degrees F. may occur. Severe fire and explosion hazards exist at these temperatures. Using radiowaves, rapid drying occurs at much lower temperatures, greatly reducing the risk of fire. In addition, lower temperature drying with radiowaves may reduce the air-born emissions from high-temperature dryers, improve the surface properties of the furnish in relation to resin bonding, and allow rapid control of furnish temperature and drying rate, not possible in conventional dryers.

The device shown in FIG. 1 has been disclosed as an example of a relatively simple, yet highly effective, device for preheating or drying a particulate furnish. A number of other devices for preheating a furnish with radiowave energy will present themselves to those skilled in the radiowave arts. For example, furnish may be preheated with a radiowave device known as a meander applicator, which is well-known in the prior art. In this case, furnish is carried on a moving dielectric belt which conveys the furnish through the meander applicator. Preheated furnish exiting the applicator is then transferred to the mold cavity.

Another possible preheating device is a standard multimode microwave cavity, also well known in the prior art. Once again, furnish would be conveyed continuously through the device on a moving dielectric belt or the furnish could be batch heated on a moving conveyor completely contained within the multimode radiowave cavity. If finish is conveyed into and out of the multimode cavity on a moving belt, input and output choke sections, well-known in the prior art, would be used to minimize radiowave emissions outside of the multimode radiowave cavity.

It is apparent from this brief discussion that, once the suggestion of preheating a furnish in the production of molded particleboard parts is made through this disclosure, and its advantages recognized, many standard radiowave heating techniques for preheating the furnish will present themselves to those skilled in the art. In fact, the ability to use a variety of standard radiowave techniques is one of the advantages of the preheating concept disclosed herein.

Figure 2:
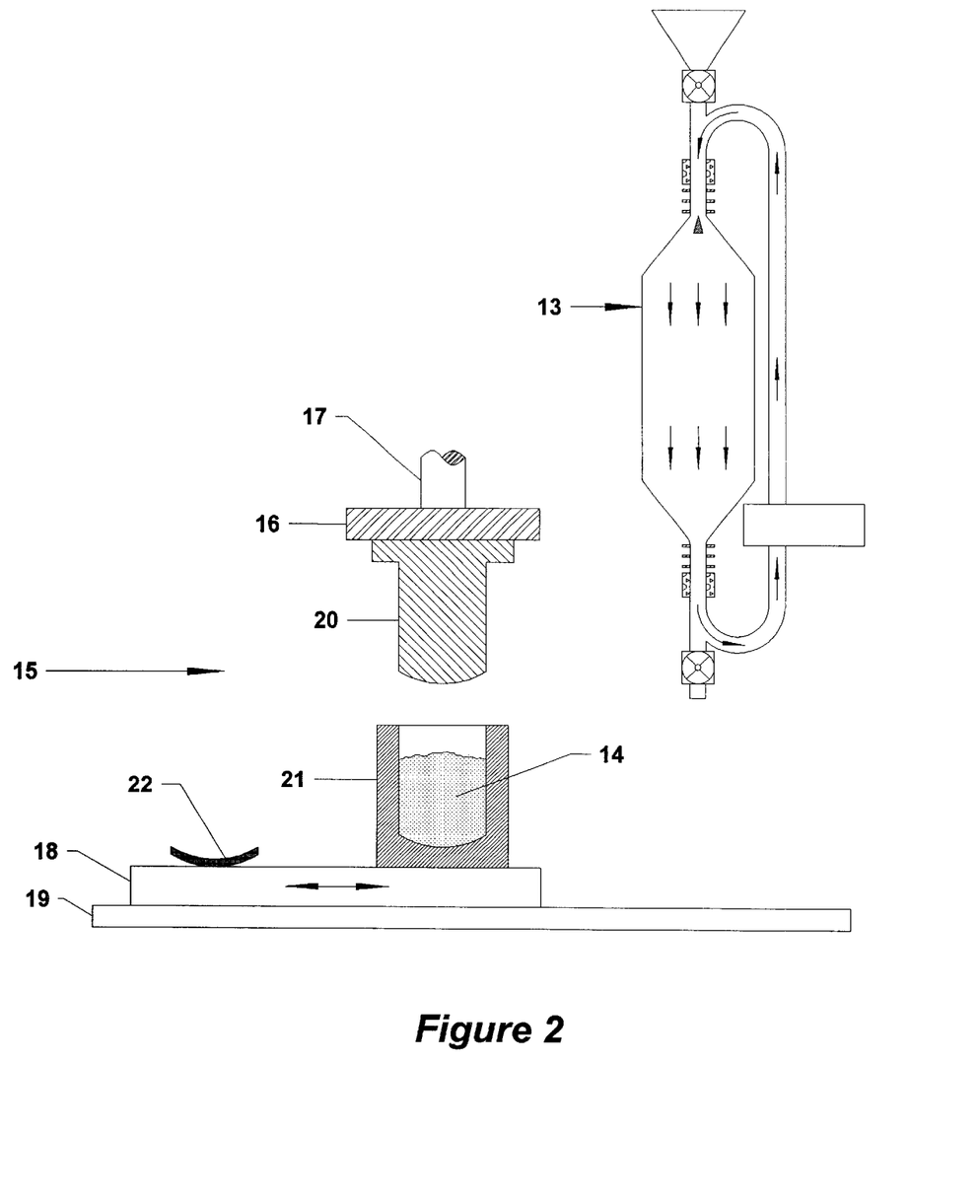
FIG. 2 is a diagram of one embodiment of the external preheating scenario to increase molded particleboard production rates, showing the process stage in which one furnish is being preheated while a second preheated furnish is simultaneously consolidated within the heated press. In this embodiment, the radiowave preheater illustrated in FIG. 1 is utilized for furnish preheating.

FIG. 2 shows how the preheater 13 of FIG. 1 would be used in combination with a heated press 15 to increase the production rate of molded particleboard parts according to the external preheating scenario described earlier in general terms. In FIG. 2, a first furnish is preheated in the preheater 13 as a second furnish 14, which has already been preheated is about to be formed in the heated press 15. The furnish within the preheater 13 is circulated in the direction of the arrows shown on the interior of the preheater 13. For clarity, only a few of the components of the heated press are shown in FIG. 2, including a heated upper platen 16, a hydraulic ram 17, and a sliceable heated lower platen 18 which slides along guide rails 19. The punch 20 of the forming mold is attached to the upper heated platen 16. The cavity 21 of the forming mold is attached to the right end of the movable heated lower platen 18.

In operation, the hydraulic ram 17 is actuated, driving the heated punch 20 into the heated cavity 21, heating the furnish 14 and compressing it into its final form. After the part has cured adequately within the heated press 15, the punch 20 is withdrawn from the cavity 21, along with the consolidated and cured part 22 which adheres to the punch 20. Adherence of the cured part 22 to the punch 20 may be assured by applying vacuum suction from the punch 22 against the cured part 22, and/or by forcing release of the cured part 22 from the cavity 21 by blowing compressed air against the cured part 22 or mechanically driving it away from the cavity 21. The sliding lower platen 18 is moved to the right so that the cavity 21 is positioned beneath the air gate 12 at the furnish exit for the preheater 13.

In this position, the finished part 22 may be ejected from the punch 20 and later removed from the press. The empty cavity 21 is then refilled with a new load of preheated furnish 14 from the preheater 13. Once the cavity 21 is filled, the sliding lower platen 18 is moved to the left so that the cavity 21 is positioned directly beneath the punch 20, and the next cycle can begin.

Figure 3:
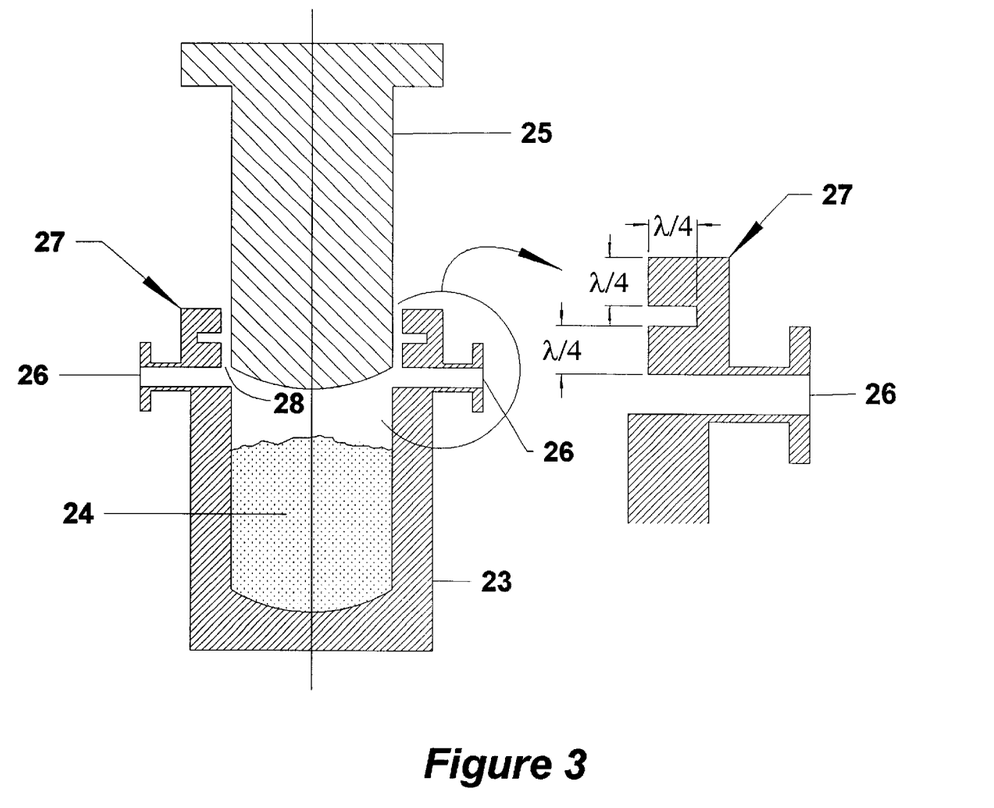
FIG. 3 shows an embodiment of the insitu preheating scenario to increase molded particleboard production rates, in which a furnish is preheated directly within the forming mold cavity within the heated press.

The time required to move the preheated furnish 14 from the preheater 13 to the cavity 21 can be eliminated using the embodiment of the invention shown in FIG. 3, which is an example of an insitu preheating scenario. In this case, a second forming mold cavity 23 is filled with unheated furnish 24, and a second forming mold punch 25 is partially inserted into the cavity 23 in a standby position. The furnish 24 may be in an uncompressed state, completely loose within the cavity 23 at this point, or the furnish 24 may be compressed to some extent.

Radiowaves are fed into the cavity 23 through a single aperture or multiple apertures in the cavity 23 just below the partially inserted punch 25. The size and shape of the apertures are arranged to yield minimal radiowave reflections from the cavity 23. Microwaves are fed to the apertures through a single radiowave input port or multiple radiowave input ports that attach to the source or sources of microwaves. In the particular embodiment shown in FIG. 3, two radiowave input ports 26 at each side of the cavity 23 are shown. Above the radiowave input ports is a contactless radiowave choke 27 formed in the space between the exterior wall of the punch 25 and the structure in the interior wall of the cavity 23 that surrounds the inserted portion of the punch 25. The contactless radiowave choke 27 is designed to allow free movement of the is punch inside of the cavity, while preventing harmful radiowave emissions from the mold.

Basically, the contactless radiowave choke 27 consists of three quarter wavelength sections, shown in the inset of FIG. 3, terminated with an open circuit, a closed circuit, and an open circuit, respectively. The quarterwave sections are connected in a way that produces a low radiowave impedance across the gap 28, between the punch 25 and the cavity 23. In this way, radiowave energy is reflected at the gap 28 and thereby confined to the cavity 23 during radiowave heating of the furnish 24. The present configuration is shown by way of example only. Other well known radiowave choke configurations exist which are disclosed in the prior art and which will present themselves to those skilled in the art.

In operation, the insitu preheating scenario that utilizes the apparatus of FIG. 2 would begin by preheating the unheated furnish 24 with radiowaves that are coupled into the mold cavity through the apertures into the cavity in the input radiowave ports 26. The punch 25 is in the standby position during radiowave preheating. After preheating the furnish 24 to the proper target temperature, the radiowaves are turned off and the punch 25 is quickly pressed into the cavity 23 to heat and compress the preheated furnish 24. After an adequate cure of the binder is obtained in this hot-pressing operation, the finished part is withdrawn from the cavity 23 along with the punch 25. The finished part adheres to the punch using the same techniques outlined for the external preheating scenario represented in FIG. 2. After the finished part is removed from the punch 25, the punch 25 is withdrawn enough that a new load of unheated furnish 24 may be added to the cavity 23. The punch 25 is then partially inserted into the standby position and the production cycle is repeated.

As an alternative to the procedure just outlined, a metal top may be substituted for the punch 25 in the standby position. The metal top would be configured to obtain the same radiowave shielding functionality as the punch 25 in the standby position. This substitution would allow insitu radiowave preheating by the above method outside of the hot press and in parallel with hot pressing of a second preheated furnish.

Figure 4:
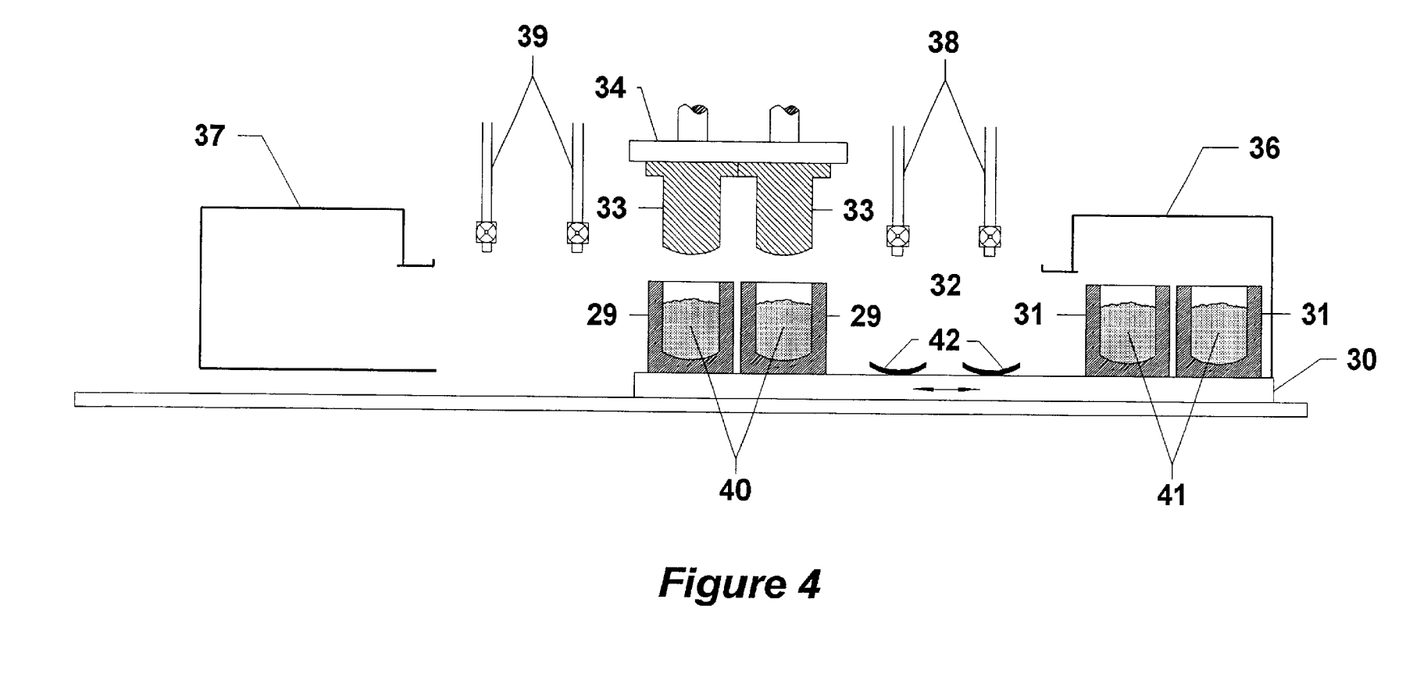
FIG. 4 shows an embodiment of the insitu preheating scenario to increase molded particleboard production rates in which furnish is preheated directly within the forming mold cavity but outside of the heated press. Preheating and simultaneous hot-pressing of furnish within pairs of forming molds is shown in FIG. 4.

An embodiment of another insitu scheme is displayed in FIG. 4. In the figure, a pair of left mold cavities 29 are mounted to the extreme left of a sliding lower platen 30 of a hot press. A pair of right mold cavities 31 are mounted to the extreme right of the sliding lower platen 30. An open space 32 is left along the sliding lower platen 30 between the pairs of cavities 29, 31 on the sliding platen 30. A pair of forming punches 33 are mounted to the upper platen 34 of the hot press. A right multimode radiowave cavity 36 and a left multimode radiowave cavity 37, together with a right pair of furnish supply lines 38 and a left pair of furnish supply lines 39, are located on either side of the hot press.

In operation, the cycle begins in the state shown in FIG. 4, in which the left mold cavities 29 are located beneath the punches 33 in the hot press. From their positions shown in FIG. 4, the punches 33 are inserted into the left cavities 29. A left furnish 40, which has been preheated with radiowave energy, is then compressed and further heated to form a pair of finished parts 42. Simultaneously, a right furnish 41 contained in the right mold cavities 31 is preheated with radiowave energy within the right multimode radiowave cavity 36. Radiowave energy from the right multimode radiowave cavity 36 is coupled to the right furnish 41 through the openings in the right mold cavities 31. After the right furnish 41 has been preheated to a target temperature and the hot-pressed left furnish 40 has cured sufficiently to form solidified finished parts 42, the punches 33 and finished parts 42 attached to the punches 33 are withdrawn from the left mold cavities 29. The finished parts 42 are withdrawn with the punches 33 in a manner similar to that described for the external preheating scenario represented by FIG. 2.

The lower platen 30 is next moved to the left so that the punches are approximately centered in the space 32 between the mold cavity pairs 29, 31. In this position, the finished parts 42 are ejected from the punches 33 and the now empty left cavities 29 are filled with fresh unheated furnish 40 from the left furnish supply lines 39. The lower platen 30 is then moved to a position in which the right mold cavities 31 are beneath the punches 33, and the left mold cavities 29 are inside of the left multimode radiowave cavity 37. The punches 33 are inserted into the right mold cavities 31 to consolidate and complete the cure of the right furnish 41, that has now been preheated. A second set of finished parts 42 is thereby formed, while the left furnish 40 is preheated to the target temperature using radiowave energy applied to the left multimode radiowave cavity 37. When the left furnish 40 has reached preheat temperature and the right furnish 41 has been adequately cured and consolidated within the hot press, the punches 33 are withdrawn from the right mold cavities 31.

The lower platen 30 is then moved to the right so that the punches 33 are, once again, approximately centered in the space 32. In this position, the second set of finished parts 42 are ejected from the punches 33, and the now empty right mold cavities 31 are filled with fresh furnish 41 from the right pair of furnish supply lines 38. With this step completed, the lower platen 30 is moved further to the right so that the left cavities 29 are once again beneath the punches 33, and the right cavities 31 are positioned inside the right multimode radiowave cavity 36. This completes one cycle of the process for this insitu preheating embodiment.

To economize on the cost of equipment for the insitu preheating embodiment represented by FIG. 4, a single source of radiowave energy may be used to supply both the right multimode microwave cavity 36 and the left multimode cavity 37. In this case, a radiowave switch would direct radiowave power alternately to each of the two radiowave multimode cavities 36, 37, as required. In addition, a single source of furnish could be used. Furnish would be alternately directed to each of the furnish supply lines 38, 39, as required, through a steering valve in the furnish outlet of the furnish source.

By utilizing multimode radiowave cavities 36, 37 to heat the furnish 40, 41 directly in the mold cavities 31, 29 in the embodiment shown in FIG. 4, radiowave preheating can be performed conveniently outside of the hot press. Radiowave preheating can thereby be performed in parallel with hot pressing to greatly increase production rates. In addition, conventional all-metal molds can be used. No modification to existing molds are required, facilitating the retrofit of radiowave preheating by this procedure to on-going molded particleboard operations. Since there is no transfer of pre-heated furnish into the mold cavity, the time between preheating and hot pressing can be minimized in this scenario, which, in turn, minimizes the possibility of precure of the preheated furnish. In addition, as is apparent from the embodiment presented in FIG. 4, multiple forming molds are readily accommodated by this method and with this apparatus.

The embodiments of radiowave preheating methods and apparatus represented in FIGS. 1–4 are not suggested in the prior art. While radiowave preheating embodiments have been described in detail above, it is to be understood that these embodiments have been described, by way of example, in order to demonstrate that radiowave preheating of furnish for molded particleboard parts is practical, effective, and relatively simple. Other embodiments for radiowave preheating of a furnish in molded particleboard production may present themselves to those skilled in the art, but it is to be understood that any specific use of radiowave preheating prior to consolidation and curing in a heated particleboard mold is encompassed within the scope of the invention. It is to be further understood that the protection granted is to be limited solely by the spirit of the invention and the scope of the following claims:

I claim:

1. A method for reducing the dwell time that a particulate furnish is retained under pressure within a forming mold during the manufacture of a three-dimensionally molded part, said particulate furnish comprising lignocellulosic particles combined with a heat-cureable binder, and said method comprising the steps of:

a. providing a multimode radiowave applicator for applying radiowave energy to said particulate furnish;

b. preheating said particulate furnish with said radiowave energy prior to the application of said pressure to said furnish, wherein said radiowave energy is applied at a predetermined rate for a predetermined time so that said particulate furnish is heated without producing substantial curing of said binder, whereby a preheated furnish is formed that may be further heated, consolidated and cured under said pressure within said forming mold, whereby said radiowave energy, by its nature, may produce rapid heating of said particulate furnish before substantial curing of said binder occurs, and whereby preheating energy may be applied to said particulate furnish to allow reduction of heat energy that may subsequently be applied in combination with said pressure within said forming mold, thereby reducing said dwell time under said pressure in said forming mold during said manufacture of a three-dimensionally molded part;

c. transferring said preheated furnish to said forming mold, wherein said forming mold includes an interior volume for containing said preheated furnish, and means for heating and shaping said furnish under said pressure into said three-dimensionally molded part;

d. applying a preselected heat energy and a preselected pressure to said preheated furnish for a predetermined time within said forming mold so that said pressure is applied to said preheated furnish, said preheated furnish is consolidated, said binder is cured, and said three-dimensionally molded part is formed, and solidified;

e. removing said three-dimensionally molded part from said forming mold.

2. The method of claim 1, wherein said step of applying said preselected heat energy and said preselected pressure to said preheated furnish is carried out in parallel with said preheating step, whereby idle time for said forming mold may be reduced, throughput of said manufacture may be increased, and maximum advantage may be taken of the substitution of a large fraction of costly in-press heating by relatively inexpensive heating performed before said pressure is applied to said furnish in said forming mold.

3. The method of claim 1, wherein said heat curable binder is a synthetic binder selected from the group consisting of urea-formaldehyde resin, phenol-formaldehyde resin, melamine-formaldehyde resin, and polyisocyanate.

4. The method of claim 1, wherein said lignocellulosic material is a wood material selected from the group consisting of wood chips, wood-fiber bundles, wood flakes, wood shavings, wood slivers, wood flour, and sawdust.

5. An apparatus for heating a particulate furnish comprising:
  a. a radiowave source;
  b. a multimode radiowave applicator including a multimode radiowave cavity comprising an enclosure including a cavity inlet and a cavity outlet;
  c. a radiowave interface comprising a radiowave input port and coupling means for transferring said radiowave energy into said multimode cavity, said coupling means including an attachment means for connecting said radiowave interface to said multimode radiowave cavity;
  d. a feed duct wherein said feed duct comprises a feed inlet, a feed outlet, and means for substantially preventing radiowave emissions beyond said feed inlet;
  e. an extraction duct comprising an extraction inlet, an extraction outlet, and means for substantially preventing radiowave emissions beyond said extraction outlet;
  f. a return duct comprising a return means for said particulate furnish, said return duct including a return inlet and a return outlet;
  g. said radiowave source being connected to said input port of said radiowave interface, said feed outlet being connected to said cavity inlet, said extraction inlet being connected to said cavity outlet, an opening in said extraction duct being connected to said return inlet, and said return outlet being connected to an opening in said feed duct;
  h. a particle transfer means for moving said particulate furnish through said feed duct, said multimode radiowave cavity, said extraction duct, and said return duct;
  i. means for adding said particulate furnish to said multimode radiowave applicator, and means for removing said particulate furnish from said multimode radiowave applicator; and including means for moving said furnish through said feed duct, said multimode radiowave cavity, said extraction duct, and said return duct, whereby said furnish in movement is substantially uniformly exposed to said radiowave energy within said multimode radiowave cavity and substantially uniformly heated.

6. The apparatus of claim 5, wherein said particle transfer means comprises an air blowing means wherein said particulate furnish is moved by a stream of flowing air circulated through said feed duct, said radiowave cavity, said extraction duct, and said return duct.

7. The apparatus of claim 5, wherein said particle transfer means comprises a screw conveyor.

8. The apparatus of claim 5 including means for dispersing said particulate furnish over a substantial volume of said multimode microwave cavity, whereby uniformity of exposure of said particulate furnish to said radiowave energy is improved compared to an undispersed furnish.

9. The apparatus of claim 5, including means for providing additive means for applying a heat-curable binder to said particulate furnish within said multimode radiowave applicator, whereby a separate mixing chamber for said binder and said particulate furnish may not be required, and the preheating time of said binder may be minimized by applying said binder after said particulate furnish has attained a preselected preheat temperature.

10. A method for reducing the dwell time that a particulate furnish is retained in a forming mold under heat and pressure in the manufacture of a three-dimensionally molded part comprising the steps of:
  a. preparing a furnish comprising lignocellulosic particles and a heat curable binder;
  b. providing a forming mold comprising a cavity and a punch, wherein said cavity and said punch include heating means for heating said furnish and compressively shaping said furnish into said three-dimensionally molded part within said forming mold;
  c. adding said furnish to said cavity;
  d. applying radiowave energy to said furnish directly within said cavity of said forming mold, wherein said radiowave energy has an approximate wavelength less than nominal dimensions of the interior of said cavity of said forming mold, whereby multiple radiowave standing-wave modes may be generated within said cavity;
  e. preheating said furnish with said radiowave energy within said cavity for a predetermined time to a predetermined preheat temperature with said radiowave energy, wherein said preheating produces negligible curing of said binder, whereby a preheated furnish is formed that may be further heated, consolidated, and cured in a later step;
  f. applying a preselected heat energy to said preheated furnish simultaneously with applying a preselected pressure between said cavity and said punch before said binder has cured substantially so that said preheated furnish is consolidated and solidified as said binder cures, whereby said lignocellulosic particles are bonded together by said binder and said three-dimensionally molded part is formed and solidified;
  g. removing said three-dimensionally molded part from said forming mold; whereby said method reduces the heating required while said furnish is solidified under simultaneous heat and pressure, thereby reducing said dwell time, and whereby the time between said preheating step and the application of pressure within said forming mold is minimized by eliminating the need to transfer said furnish to said forming mold after said preheated furnish is produced.

11. The method of claim 10, wherein said step of applying radiowave energy comprises:
  a. providing a multimode radiowave enclosure outside of and encompassing said forming mold;
  b. applying said radiowave energy to said multimode radiowave enclosure prior to insertion of said punch into said cavity, whereby said radiowave energy from said multimode radiowave enclosure may enter said cavity and heat said furnish, and whereby a system is produced in which a plurality of cavities may be preheated within a single, all-encompassing multimode radiowave enclosure.

12. The method of claim 10, wherein said step of applying radiowave energy includes:

a. inserting said punch into said cavity to a predetermined preheat position;
   b. providing a radiowave choke structure between said cavity and said punch in said preheat position whereby said radiowave energy may be contained within the space between said cavity and said punch.

13. A radiowave applicator for heating particulate matter comprising:

a. a radiowave source;
   b. a multimode radiowave applicator including a multimode radiowave cavity comprising an enclosure including a cavity inlet and a cavity outlet;
   c. a radiowave interface comprising a radiowave input port and means for coupling said radiowave energy into said multimode cavity, said means for coupling said radiowave energy including an attachment means for connecting said radiowave interface to said multimode radiowave cavity;
   d. a feed duct wherein said feed duct comprises a feed inlet, a feed outlet, and means for preventing radiowave emissions beyond said feed inlet;
   e. an extraction duct comprising an extraction inlet, an extraction outlet, and means for preventing radiowave emissions beyond said extraction outlet;
   f. a return duct comprising a return means for said particulate matter and including a return inlet, and a return outlet;
   g. said radiowave source being connected to said input port of said radiowave interface, said feed outlet being connected to said cavity inlet, said extraction inlet being connected to said cavity outlet, said extraction outlet being connected to said return inlet, and said return outlet being connected to said feed inlet;
   h. a particle transfer means for moving said particulate matter through said feed duct, said multimode radiowave cavity, said extraction duct, and said return duct;
   i. means for adding said particulate matter to said radiowave applicator, and means for extracting said particulate matter from said radiowave applicator; whereby said radiowave applicator may be provided for preheating or drying a particulate furnish used in the manufacture of three-dimensionally molded parts, or for drying a particulate furnish used in the manufacture of flat composition boards prior to the addition of a binder.

14. The apparatus of claim 13, wherein said particulate matter is selected from the group consisting of wood chips, wood-fiber bundles, wood flakes, wood shavings, wood slivers, wood flour, and sawdust.

15. The apparatus of claim 13, wherein said particle transfer means comprises an air blowing means wherein said particulate furnish is moved by a stream of flowing air circulated through said feed duct, said radiowave cavity, said extraction duct, and said return duct.

16. The apparatus of claim 13 including means for monitoring the moisture content of said particulate matter, whereby drying level of said particulate matter can be determined prior to the addition of binders.

* * * * *